(12) United States Patent
Collins et al.

(10) Patent No.: US 11,365,809 B2
(45) Date of Patent: Jun. 21, 2022

(54) MECHANICAL SEAL PROTECTOR FOR ESP SEAL SECTIONS

(71) Applicant: Baker Hughes ESP, Inc., Houston, TX (US)

(72) Inventors: Charles Collins, Oklahoma City, OK (US); James Le, Oklahoma City, OK (US)

(73) Assignee: Baker Hughes ESP, Inc., Houston, TX (US)

( * ) Notice: Subject to any disclaimer, the term of this patent is extended or adjusted under 35 U.S.C. 154(b) by 0 days.

(21) Appl. No.: 15/531,102

(22) PCT Filed: Dec. 5, 2014

(86) PCT No.: PCT/US2014/068905
§ 371 (c)(1),
(2) Date: May 26, 2017

(87) PCT Pub. No.: WO2016/089426
PCT Pub. Date: Jun. 9, 2016

(65) Prior Publication Data
US 2017/0321806 A1 Nov. 9, 2017

(51) Int. Cl.
| | |
|---|---|
| *E21B 43/12* | (2006.01) |
| *F16J 15/3252* | (2016.01) |
| *F04D 29/70* | (2006.01) |
| *F04D 13/10* | (2006.01) |
| *F04D 29/10* | (2006.01) |
| *F04D 29/041* | (2006.01) |
| *E21B 43/38* | (2006.01) |

(52) U.S. Cl.
CPC ......... *F16J 15/3252* (2013.01); *E21B 43/128* (2013.01); *E21B 43/38* (2013.01); *F04D 13/10* (2013.01); *F04D 29/0413* (2013.01); *F04D 29/106* (2013.01); *F04D 29/708* (2013.01)

(58) Field of Classification Search
CPC .............................. E21B 43/128; E21B 43/38
See application file for complete search history.

(56) References Cited

U.S. PATENT DOCUMENTS

| | | | | |
|---|---|---|---|---|
| 4,477,235 A | * | 10/1984 | Gilmer ................... | H02K 5/132 184/45.1 |
| 4,667,737 A | | 5/1987 | Shaw et al. | |

(Continued)

OTHER PUBLICATIONS

International Search Report and Written Opinion issued in connection with corresponding PCT Application No. PCT/US2014/068905 dated Sep. 11, 2015.

(Continued)

*Primary Examiner* — Gilbert Y Lee
(74) *Attorney, Agent, or Firm* — Crowe & Dunlevy, P.C.

(57) ABSTRACT

A seal section for use in a downhole submersible pumping system includes one or more fluid separation mechanisms, a shaft, a mechanical seal chamber and a mechanical seal inside the mechanical seal chamber. The seal section further comprises a mechanical seal protector around the mechanical seal. The mechanical seal protector includes a cap that surrounds a portion of the mechanical seal and a filter screen. The cap may also include one or more expulsion ports extending through the cap. The cap may be stationary or connected to the shaft and configured for rotation.

12 Claims, 7 Drawing Sheets

(56) References Cited

U.S. PATENT DOCUMENTS

| | | | |
|---|---|---|---|
| 4,684,331 A | 8/1987 | LaGrange et al. | |
| 5,367,214 A * | 11/1994 | Turner, Jr. | F04B 43/082 310/87 |
| 6,595,280 B2 * | 7/2003 | Traylor | E21B 43/128 166/105.5 |
| 6,666,664 B2 * | 12/2003 | Gross | E21B 43/128 166/105 |
| 7,182,584 B2 | 2/2007 | Du et al. | |
| 8,246,328 B1 | 8/2012 | Howell et al. | |
| 2005/0087343 A1 * | 4/2005 | Du | E21B 4/003 166/369 |
| 2007/0207046 A1 | 9/2007 | Du et al. | |
| 2012/0026361 A1 | 10/2012 | Tetzlaff et al. | |

OTHER PUBLICATIONS

Office Action issued in connection with corresponding CO Application No. 2017/0006782 dated Feb. 8, 2019.

* cited by examiner

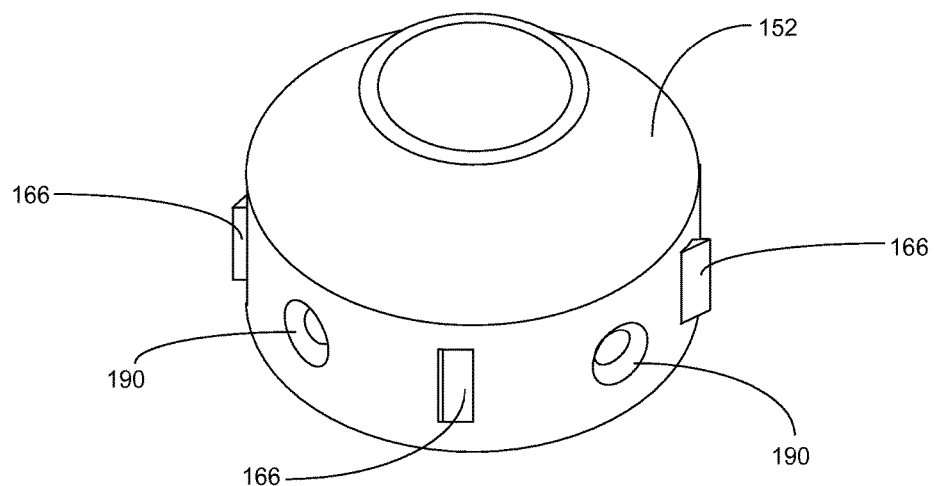
FIG. 7
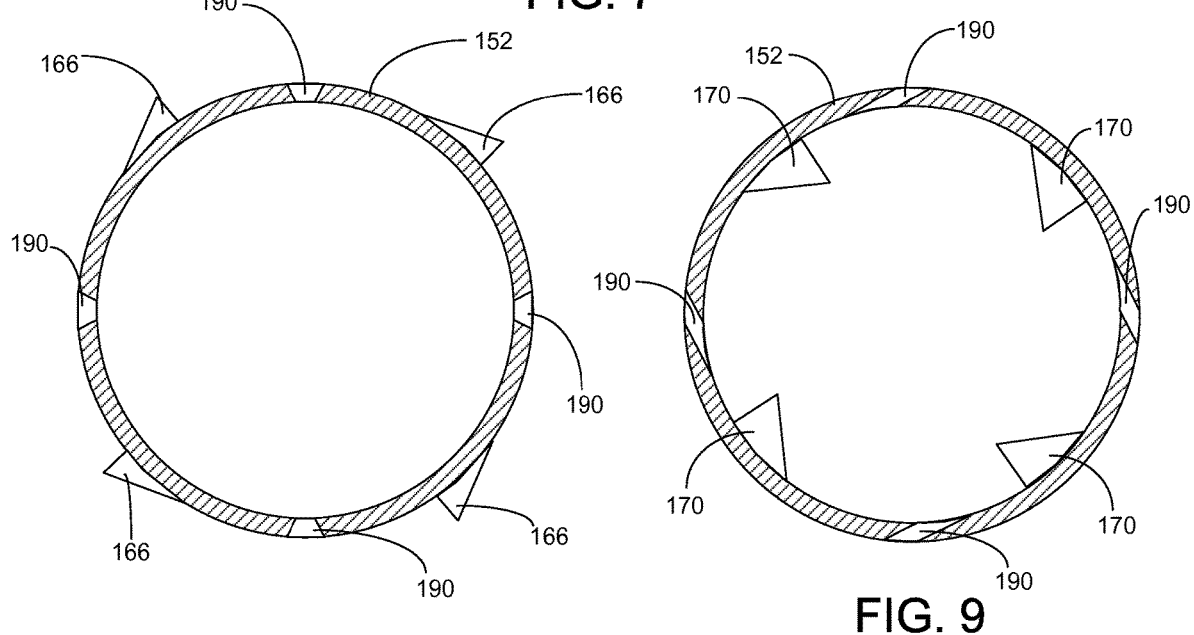
FIG. 8
FIG. 9

MECHANICAL SEAL PROTECTOR FOR ESP SEAL SECTIONS

FIELD OF THE INVENTION

This invention relates generally to the field of submersible pumping systems, and more particularly, but not by way of limitation, to an improved seal section.

BACKGROUND

Submersible pumping systems are often deployed into wells to recover petroleum fluids from subterranean reservoirs. Typically, the submersible pumping system includes a number of components, including one or more fluid filled electric motors coupled to one or more high performance pumps. Each of the components and sub-components in a submersible pumping system is engineered to withstand the inhospitable downhole environment, which includes wide ranges of temperature, pressure and corrosive well fluids.

Components commonly referred to as "seal sections" protect the electric motors and are typically positioned between the motor and the pump. In this position, the seal section provides several functions, including transmitting torque between the motor and pump, restricting the flow of wellbore fluids into the motor, protecting the motor from axial thrust imparted by the pump, and accommodating the expansion and contraction of motor lubricant as the motor moves through thermal cycles during operation. Many seal sections employ seal bags, labyrinth chambers and other separation mechanism to accommodate the volumetric changes and movement of fluid in the seal section while providing a positive barrier between clean lubricant and contaminated wellbore fluid.

Because most seal sections include one or more rotating shafts that transfer torque from the motor to the pump, the fluid separation mechanisms in the seal section must be configured to accommodate the shaft. In the past, mechanical seals have been placed around the shaft to prevent fluids from migrating along the shaft. Generally, a mechanical seal includes components that provide a structural barrier against fluid migration. A popular design employs a spring on the exterior of the mechanical seal that exerts axial force on components of the mechanical seal. The spring keeps the components of the mechanical seal in proper position to keep the well bore fluids from migrating along the shaft.

While generally acceptable, prior art mechanical seals may be susceptible to failure in certain environments. As wellbore fluids are drawn into the seal section, sand and other particulate solids may collect in the proximity of the mechanical seal. Contamination with solid particles degrades the performance characteristics of the mechanical seal spring and compromises the sealing surfaces of the mechanical seal, resulting in a failure of the mechanical seal. Accordingly, there exists a need for an improved design that is more resistant to contamination and wear caused by solid particles. It is to this and other deficiencies in the prior art that the present invention is directed.

SUMMARY OF THE INVENTION

In presently preferred embodiments, a seal section for use in a downhole submersible pumping system includes one or more fluid separation mechanisms, a shaft, a mechanical seal chamber and a mechanical seal inside the mechanical seal chamber. The seal section further comprises a mechanical seal protector around the mechanical seal. The mechanical seal protector includes a filter screen and a cap that surrounds a portion of the mechanical seal.

Other preferred embodiments include a seal section for use in a downhole submersible pumping system disposed in a wellbore. The seal section includes one or more fluid separation mechanisms, a rotatable shaft, a mechanical seal chamber and a mechanical seal located in the mechanical seal chamber. The seal section further includes a mechanical seal protector surrounding a portion of the mechanical seal. The mechanical seal protector includes a cap that is connected to the rotatable shaft. The cap comprises a plurality of expulsion ports extending through the cap.

Yet other preferred embodiments include a mechanical seal protector for use in a seal section that includes a rotatable shaft and a mechanical seal around the rotatable shaft. The mechanical seal protector includes a stationary cap, a filter between the mechanical seal and the stationary cap and an auxiliary seal secured to the stationary cap. The auxiliary seal provides a sealing interface between the stationary cap and the rotatable shaft.

BRIEF DESCRIPTION OF THE DRAWINGS

FIG. 7 is a perspective view of the cap of the mechanical seal protector of preferred embodiments.

FIG. 8 is a cross-sectional view of the cap of FIG. 7.

FIG. 9 is a cross-sectional view of a cap constructed in accordance with another preferred embodiment.

DETAILED DESCRIPTION OF THE PREFERRED EMBODIMENTS

Figure 1:
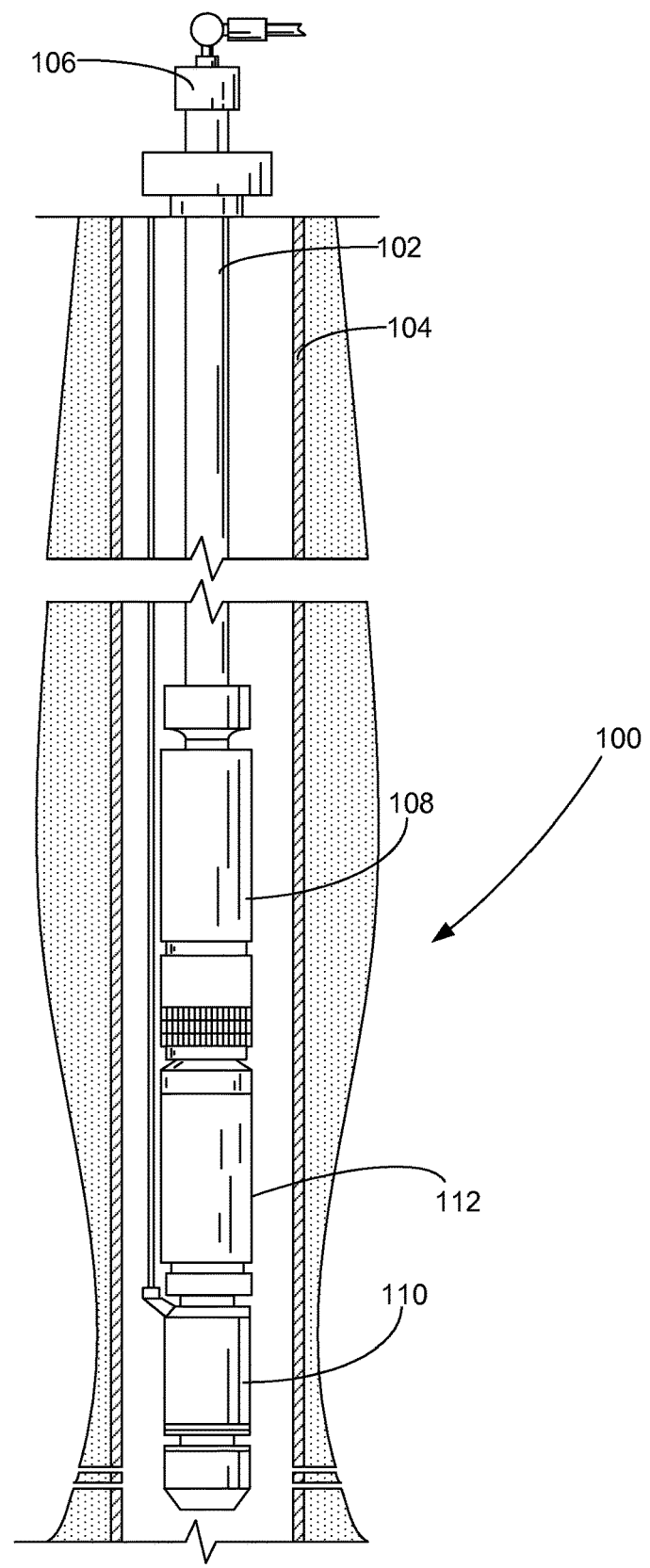
FIG. 1 is an elevational view of a submersible pumping system constructed in accordance with a presently preferred embodiment.

In accordance with a preferred embodiment of the present invention, FIG. 1 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system are primarily disclosed in a submersible application, some or all of these components can also be used in surface pumping operations.

The pumping system 100 preferably includes some combination of a pump assembly 108, a motor assembly 110 and a seal section 112. The motor assembly 110 is preferably an electrical motor that receives power from a surface-mounted motor control unit (not shown). When energized, the motor assembly 110 drives a shaft that causes the pump assembly 108 to operate. The seal section 112 shields the motor assembly 110 from mechanical thrust produced by the pump assembly 108 and provides for the expansion of motor lubricants during operation. The seal section 112 also isolates the motor assembly 110 from the wellbore fluids passing through the pump assembly 108. Although only one of each component is shown, it will be understood that more can be connected when appropriate. It may be desirable to use tandem-motor combinations, multiple seal sections, multiple pump assemblies or other downhole components not shown in FIG. 1. For example, in certain applications it may be desirable to place a seal section 112 below the motor assembly 110.

Figure 2:
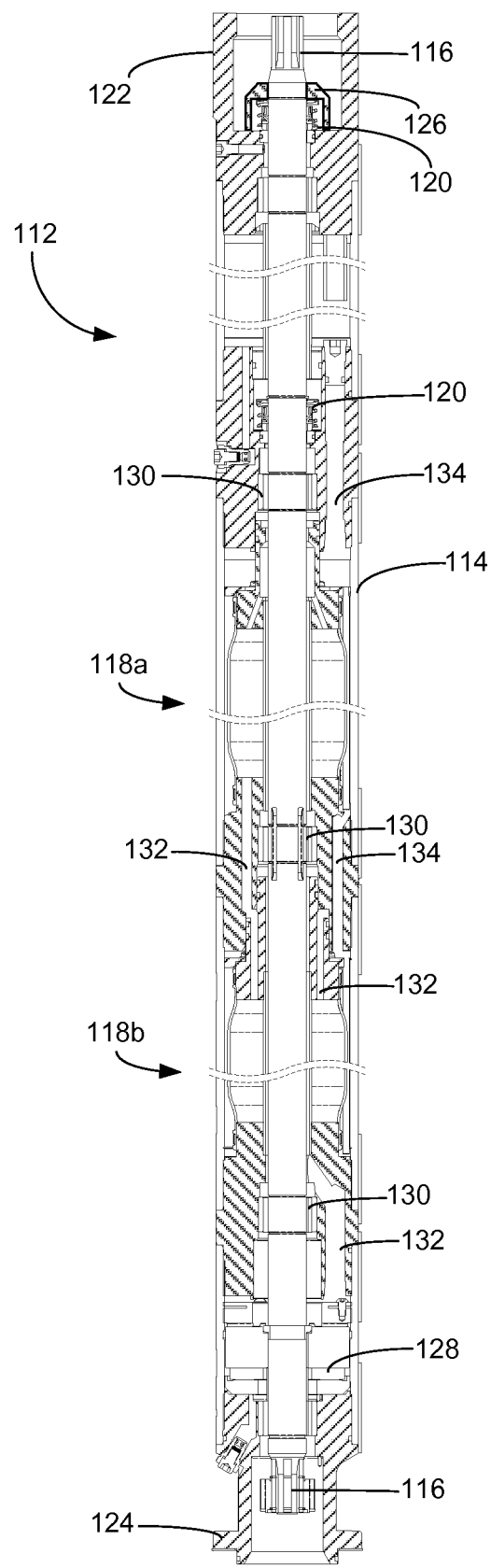
FIG. 2 is a cross-sectional view of a first preferred embodiment of a seal section for use with the submersible pumping system of FIG. 1.

Referring now to FIG. 2, shown therein is a cross-sectional view of the seal section 112. The seal section 112 includes a housing 114, a shaft 116, and one or more fluid separation mechanisms. In the preferred embodiment depicted in FIG. 2, the fluid separation mechanisms include a first seal bag assembly 118a and a second seal bag assembly 118b (collectively "seal bag assemblies 118"). The shaft 116 transfers mechanical energy from the motor assembly 110 to the pump assembly 108. The housing 114 is configured to protect the internal components of the seal section 112 from the exterior wellbore environment. Other separation mechanisms may be used in addition to, or as an alternative to, the seal bag assemblies 118. Such other separation mechanisms include pistons, labyrinths and bellows.

The seal section 112 further includes a plurality of mechanical seals 120, a head 122 configured for connection to the pump assembly 108 (not shown in FIG. 2), and a base 124 configured for connection to the motor assembly 110 (not shown in FIG. 2). The head 122 and base 124 are preferably configured for a locking threaded engagement with the housing 114. The mechanical seals 120 are positioned along the shaft 116 and limit the migration of fluid along the shaft 116. The seal section further includes one or more mechanical seal protectors 126. In the particularly preferred embodiment depicted in FIG. 2, the seal section 112 includes a single mechanical seal protector 126 in the head 122.

The seal section 112 further includes thrust bearings 128 and a plurality of support bearings 130. Thrust bearings 128 are used to control the axial displacement of the shaft 116. Support bearings 130 control the lateral position of the shaft 116. In the presently preferred embodiments, the thrust bearings 128 and support bearings 130 are configured as hydrodynamic bearings and constructed using industry-recognized bearing materials.

The fluid separation mechanisms of the seal section 112 further includes a series of ports, channels, chambers and tubes that permit the movement of fluids through the seal section 112. A clean fluid circulation system 132 accommodates the expansion and movement of clean motor lubricant through the seal section 112. A contaminated fluid circulation system 134 accommodates the movement of potentially contaminated wellbore fluids through the seal section 112. The contaminated fluid circulation system 134 passes fluid along the exterior of the bag assemblies 118, while the clean fluid circulation system 132 passes fluid through the interior of the bag assemblies 118.

The mechanical seal protector 126 improves the durability of the seal section 112 by reducing the exposure of the mechanical seal 120 to particulates and other debris from the wellbore 104 and pump assembly 108. It will be appreciated that each of the preferred embodiments includes various features that may be expressed in additional combinations that are not depicted in the drawings. In this way, the preferred embodiments disclosed herein are intended to provide a disclosure of the various features that may be incorporated in various combinations within the mechanical seal protector 126 and seal section 112. These presently preferred embodiments should not be construed or interpreted as an exhaustive identification of the combinations of these features.

Figure 3:
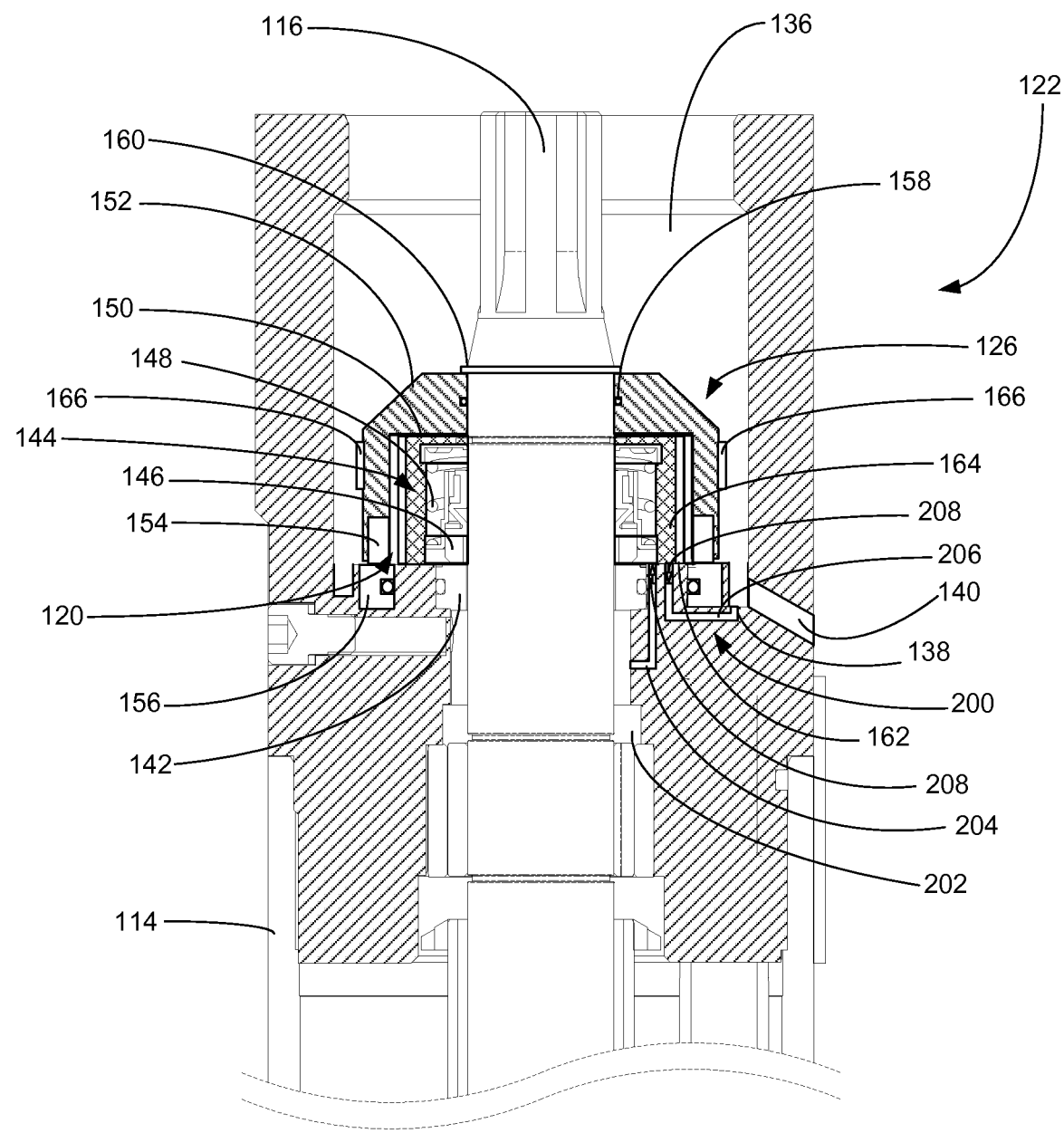
FIG. 3 is a close-up cross-sectional view of the head of the seal section of FIG. 2 showing a first preferred embodiment of the mechanical seal protector.

Turning to FIG. 3, shown therein is a close-up cross-sectional view of the head 122 of the seal section 112. The head 122 includes a mechanical seal chamber 136 that is configured to house the mechanical seal 120 and the mechanical seal protector 126. The mechanical seal chamber 136 is generally configured as a void in the head 122. The mechanical seal chamber 136 may optionally include a trench 138 for the collection of solids particles and solid ejection ports 140 configured to expel solid particles from the mechanical seal chamber 136. The trench 138 entraps solid particles in the mechanical seal chamber 136 at a distance spaced apart from the mechanical seal 120 and mechanical seal protector 126. The ejection port 140 is preferably located at the bottom of the trench 138 to utilize gravity to expel particles from the head 122.

The mechanical seal 120 preferably includes a stationary ring 142 and a rotating portion 144. The stationary ring 142 is fixed in position inside the head 122 and does not rotate with the shaft 116. The rotating portion 144 is fixed to the shaft 116 and rotates with respect to the stationary ring 142. The rotating portion 144 preferably includes a runner 146, a spring 148 and a retainer ring 150. The running faces of the runner 146 and stationary ring 142 are held in contact by the spring 148, which creates a compressive force between the retainer ring 150 and runner 146.

In the first preferred embodiment depicted in FIG. 3, the mechanical seal protector 126 includes a cap 152, a contact ring 154 and a fixed ring 156. The fixed ring 156 is secured in a stationary position within the head 122. The cap 152 is configured as an inverted bowl that is secured at a first end to the shaft 116 and extends downward over the mechanical seal 120. In a particularly preferred embodiment, the cap 152 is connected to the shaft 116 with a key-and-slot mechanism. The cap 152 may include an elastomeric o-ring 158 and an axial retaining ring 160. The o-ring 158 dampens vibrations in the cap 152 and the axial retaining ring 160 fixes the cap 152 at a determined position along the shaft 116. The o-ring 158 can alternatively be replaced with an elastomeric damper.

The contact ring 154 is connected at the second, distal end of the cap 152 in close proximity to the fixed ring 156. In a particularly preferred embodiment, the mechanical seal protector 126 is configured and installed such that the contact ring 154 is in vertical contact with the fixed ring 156. In this way, the mechanical seal protector 126 surrounds the mechanical seal 120 and its interior defines an internal seal chamber 162. During assembly, the internal seal chamber 162 is preferably filled with a relatively heavy lubricating oil or grease. The mechanical seal protector 126 discourages the migration of fluids and particles from the mechanical seal chamber 136 to the mechanical seal 120. The isolation of the mechanical seal 120 by the mechanical seal protector 126 significantly improves the operational life of the mechanical seal 120 and the balance of the components within the seal section 112.

The head 122 optionally includes a fluid exchange system 200 that includes a clean lubricant reservoir 202, a first exchange port 204 and a second exchange port 206. The clean lubricant reservoir 202 retains clean lubricants that are emplaced during manufacture. The first exchange port 204 connects the clean lubricant reservoir 202 to the internal chamber 162. The second exchange port 206 connects the internal chamber 162 to the mechanical seal chamber 136. In a particularly preferred embodiment, one-way check valves 208 in the first and second fluid exchange ports 204, 206 prevent the backflow of fluid from the internal chamber 162 to the lubricant reservoir 202 and from the mechanical seal chamber 136 to the internal chamber 162.

In the first preferred embodiment depicted in FIG. 3, the mechanical seal protector 126 further includes an internal filter 164 and one or more external vanes 166. The internal filter 164 resides in the internal seal chamber 162 between the mechanical seal 120 and the cap 152. The internal filter 164 is preferably manufactured from metal or fabric mesh with a pore size that is selected to capture small particles before they reach the mechanical seal 120. The external vanes 166 are connected to the exterior surface of the cap 152 and are designed to induce a turbulence within the mechanical seal chamber 136. The turbulence increases the likelihood of solid particle contaminants being expelled through the solid ejection ports 140. In a particularly preferred embodiment, the external vanes 166 are configured as paddles.

Figure 4:
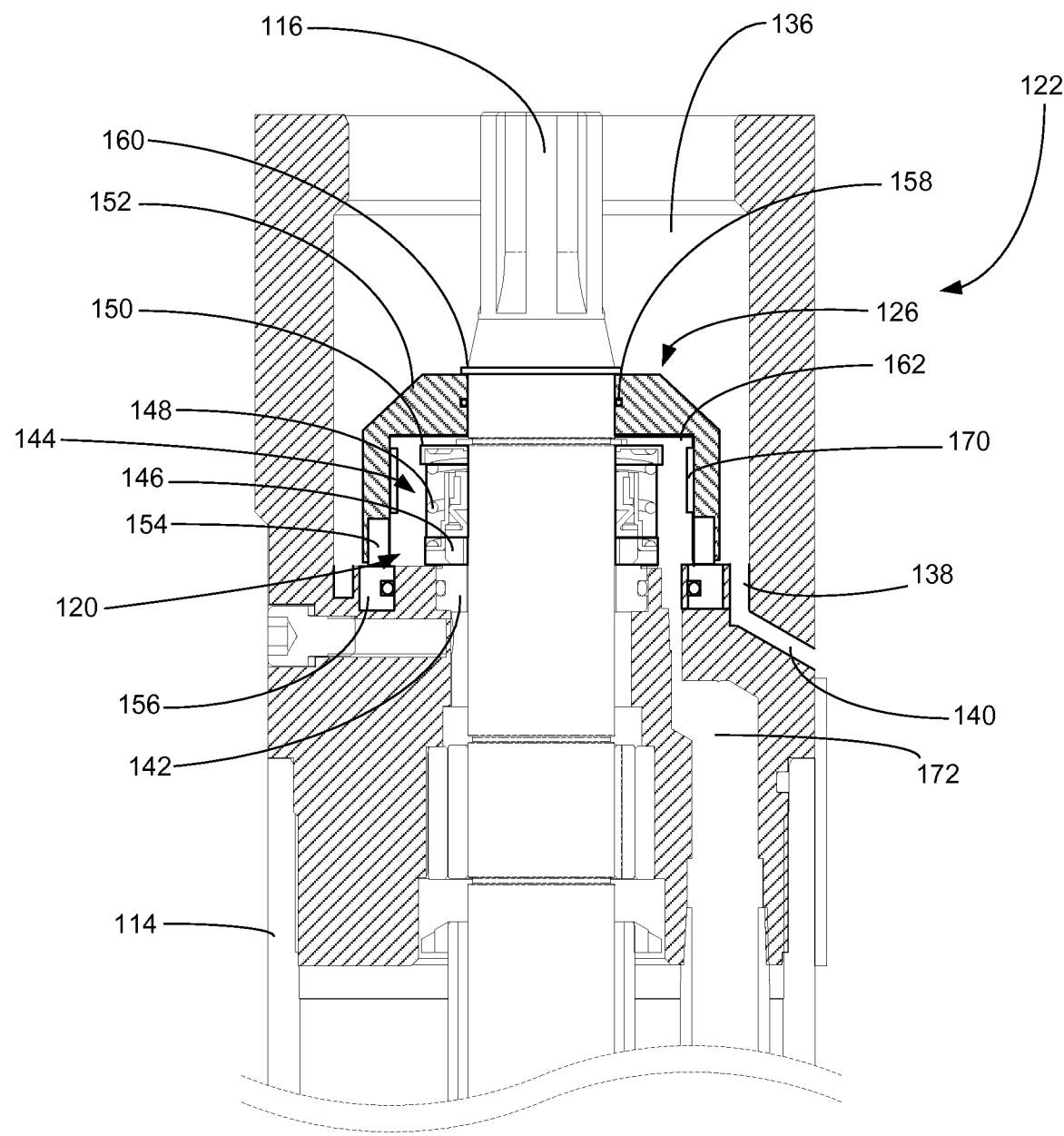
FIG. 4 is a close-up cross-sectional view of the head of the seal section of FIG. 2 showing a second preferred embodiment of the mechanical seal protector.

Turning to FIG. 4, shown therein is a close-up cross-sectional view of the head 122 of the seal section 112 constructed in accordance with a second preferred embodiment. In the second preferred embodiment depicted in FIG. 4, the mechanical seal protector 126 includes one or more internal vanes 170. The one or more internal vanes 170 are connected to the interior side of the cap 152 and are configured to induce a turbulence in the internal seal chamber 162. The turbulence within the internal seal chamber 162 reduces the risk of particulate solids settling against the mechanical seal 120. The second preferred embodiment further includes a lubricant exchange port 172 that connects the internal seal chamber 162 to the seal bag assembly 118. In contrast, the first preferred embodiment depicted in FIG. 3 does not include the lubricant exchange port 172.

Figure 5:
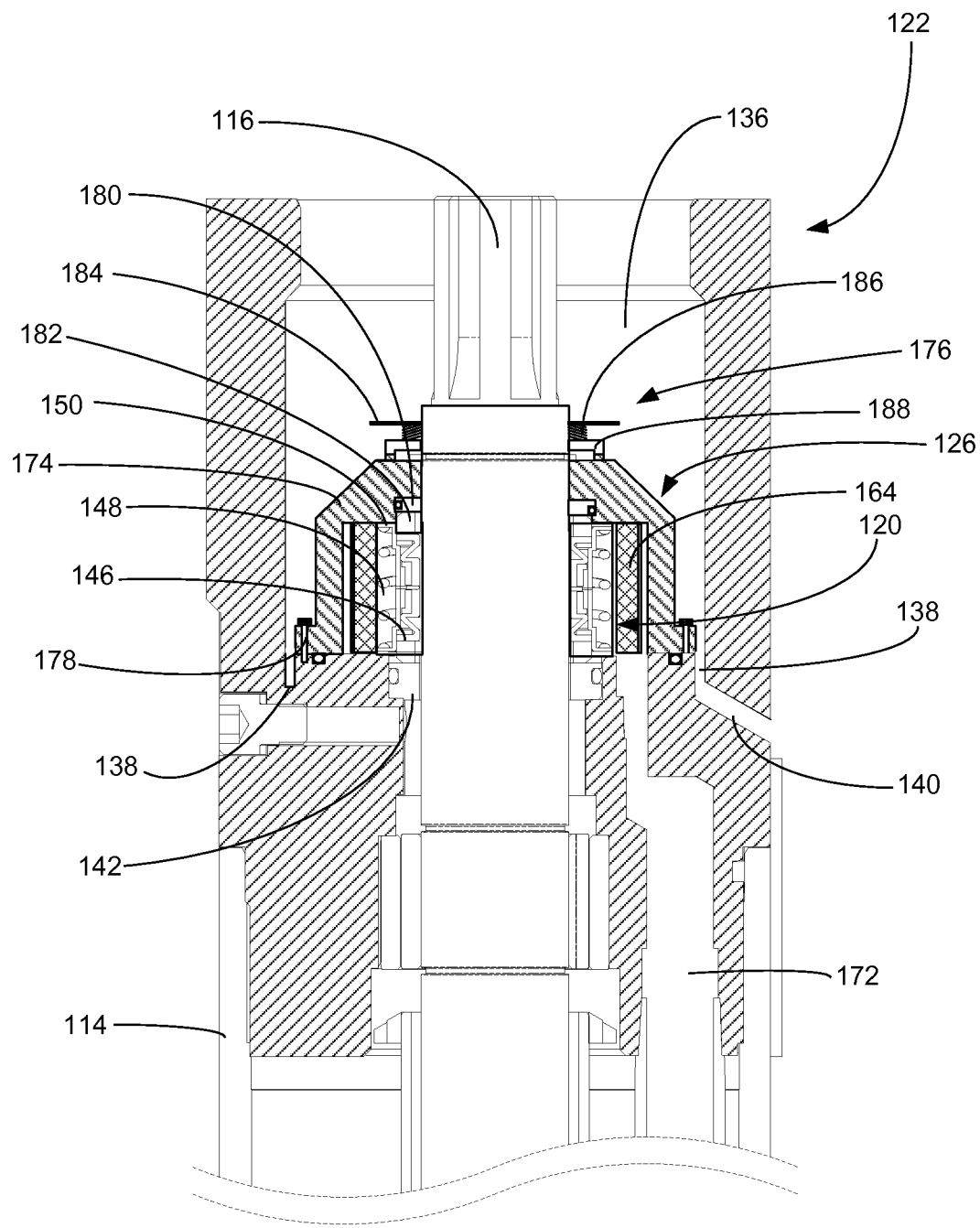
FIG. 5 is a close-up cross-sectional view of the head of the seal section of FIG. 2 showing a third preferred embodiment of the mechanical seal protector.

Turning to FIG. 5, shown therein is a third preferred embodiment of the mechanical seal protector 126. In the third preferred embodiment, the mechanical seal protector 126 includes a stationary cap 174 that is secured in a stationary position within the head 122 and an auxiliary seal 176 that seals the shaft 116 through the stationary cap 174. In a particularly preferred embodiment, the stationary cap 174 is secured within the head 122 by fasteners 178 or by other suitable attachment mechanism. The third preferred embodiment depicted in FIG. 5 further includes the internal filter 164 and lubricant exchange port 172. In an alternate variation of the third preferred embodiment, the stationary cap 174 is itself manufactured from a filter screen material which obviates the need for an independent internal filter 164.

The mechanical seal protector 126 includes a captured ring 180 in a fixed position within the stationary cap 174 and a rotational ring 182. The rotational ring 182 is adjacent the retainer ring 150 of the mechanical seal 120. The spring 148 presses the retainer ring 150 and rotational ring 182 against the stationary captured ring 180 to create a sealing interface at the mechanical seal protector 126. In this way, the spring 148 provides compression for both the mechanical seal 120 and mechanical seal protector 126.

The auxiliary seal 176 includes a backing plate 184, a spring 186 and a lip seal 188. The backing plate 184 is fixed in position and rotates with the shaft 116. The spring 186 is opposed by the backing plate 184 and forces the lip seal 188 against the top of the stationary cap 174. In this way, the auxiliary seal 176 provides an additional seal at the top of the stationary cap 174 and thereby reduces the potential for well fluid contamination inside the cap 174. Although the third preferred embodiment has been depicted with a lip seal 188, it will be appreciated that other seals can be used to seal the stationary cap 174 from the rotating shaft 116. For example, it may be desirable to utilize a mechanical seal between the shaft 116 and the top of the stationary cap 174.

Figure 6:
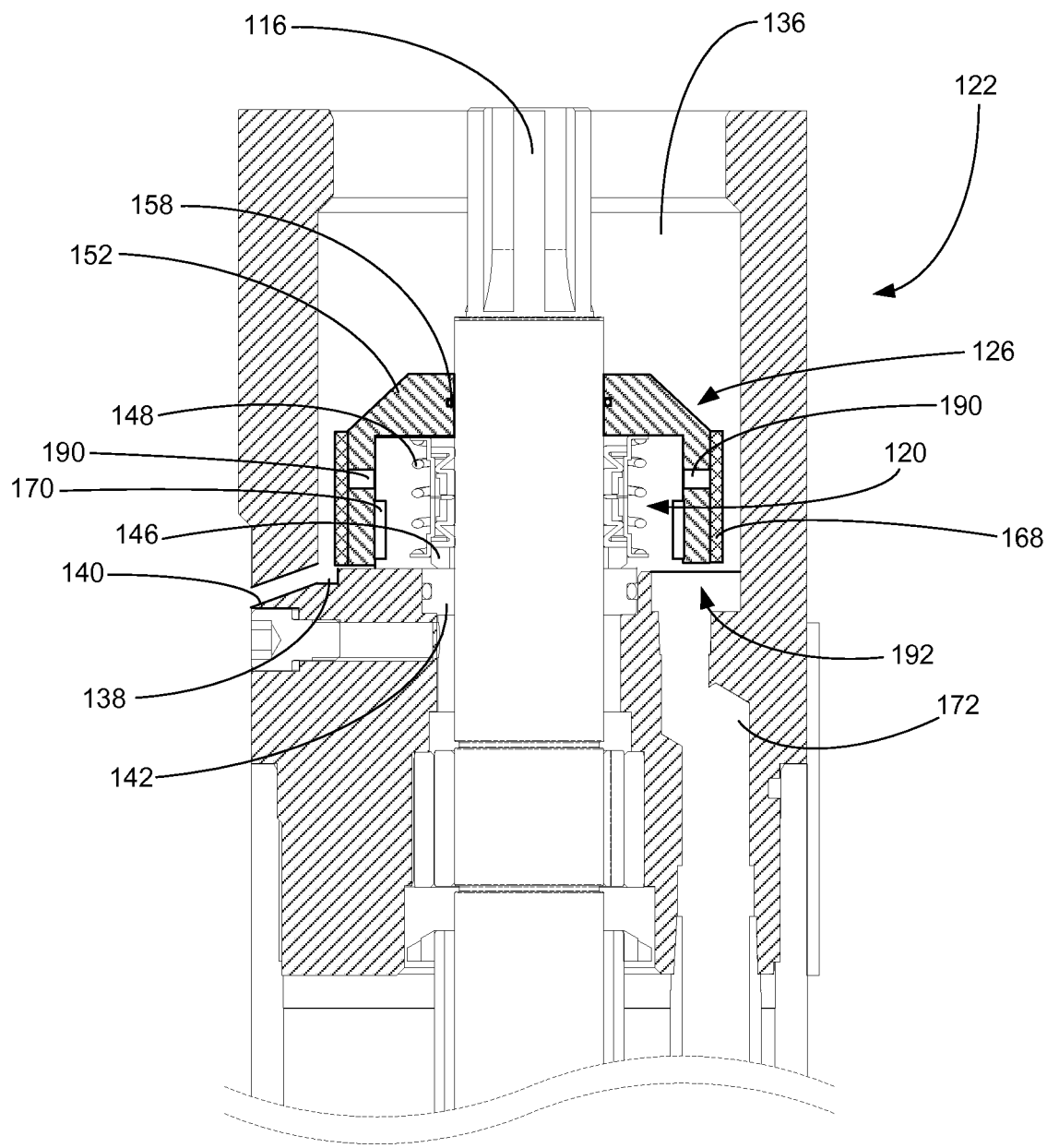
FIG. 6 is a close-up cross-sectional view of the head of the seal section of FIG. 2 showing a fourth preferred embodiment of the mechanical seal protector.

Turning to FIG. 6, shown therein is a fourth preferred embodiment of the mechanical seal protector 126. In the fourth preferred embodiment, the mechanical seal protector 126 includes a cap 152 that is attached to, and configured for rotation with, the shaft 116. The cap 152 of the fourth preferred embodiment includes an external filter 168 expulsion ports 190 that extend through the cap 152. The external filter 168 is preferably manufactured from fabric or metal mesh, or porous media such as ceramic filter sand. The external filter 168 is preferably secured to the exterior of the cap 152. The external filter 168 traps solid particles within the mechanical seal chamber 136. The expulsion ports 190 are configured to remove particulate solids from the internal seal chamber 162. To provide for the circulation of fluid into the internal seal chamber 162, the mechanical seal protector 126 of FIG. 6 further includes a lower opening 192 adjacent the trench 138. The placement of the lower opening 192 at the bottom of the cap 152 encourages the gravity-based separation of solids from the fluids entering the internal seal chamber 162. To reduce particle settling within the internal seal chamber 162, the mechanical seal protector 126 of the fourth preferred embodiment further includes internal vanes 170.

Turning to FIGS. 7-9, shown therein are perspective and cross-sectional views, respectively, of the cap 152. The cap 152 of FIGS. 7 and 8 includes external vanes 166 and expulsion ports 190. The expulsion ports 190 are preferably tapered from the outside of the cap 152 to the inside of the cap 152. The tapered configuration of the expulsion ports 190 encourages the movement of fluid out of the internal seal chamber 162. In the alternate embodiment of the cap 152 depicted in the cross-sectional view of FIG. 9, the cap 152 includes internal vanes 170 and expulsion ports 190. The expulsion ports 190 extend through the cap 152 at an offset angle that promotes the expulsion of particles through a pumping action as the cap 152 rotates. It will further be noted that the external vanes 166 of FIGS. 7 and 8 and the internal vanes 170 of FIG. 9 are pitched to encourage the production of turbulent fluid flow within the mechanical seal chamber 136 and internal seal chamber 162.

Thus, the preferred embodiments include a pumping system 100 that includes a pump assembly 108, a motor assembly 110 and a seal section 112. The seal section 112 includes one or more fluid separation mechanisms 118 and one or more mechanical seals 120 disposed along the shaft 116. To improve the resiliency of the mechanicals seals 120 to the intrusion of wellbore fluids and particles, the seal section further includes one or more mechanical seal protectors 126. Each of the one or more mechanical seal protectors 126 is configured and installed to eliminate or mitigate the exposure of the corresponding mechanical seal 120 to wellbore fluids and particles. The use of the mechanical seal protectors 126 is believed to prolong the useful life of the mechanical seals 120 and the seal section 112.

It will be further understood that aspects of the various embodiments disclosed herein are interchangeable unless otherwise noted. For example, it may be desirable in certain applications to combine the use of both internal vanes 170 and external vanes 166. As additional examples, it may be desirable to employ the expulsion ports 190 with the first, second and third preferred embodiments of the mechanical seal protection 126. It may also be desirable to include both the internal filter 164 and the external filter 168 within a single mechanical seal protector 126.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A seal section for use in a downhole submersible pumping system disposed in a wellbore, the seal section comprising:
    one or more fluid separation mechanisms;
    a rotatable shaft;
    a mechanical seal chamber;
    a mechanical seal located in the mechanical seal chamber, wherein the mechanical seal is disposed along the shaft; and
    a mechanical seal protector surrounding a portion of the mechanical seal, the mechanical seal protector comprising a cap connected to the rotatable shaft, wherein the cap comprises a plurality of expulsion ports extending through the cap, and a filter screen located between the mechanical seal and the cap.

2. The seal section of claim 1, wherein the mechanical seal protector further comprises a filter screen located external to the cap.

3. The seal section of claim 1, wherein the cap is stationary and wherein the mechanical seal protector further comprises an auxiliary seal.

4. The seal section of claim 1, wherein the cap is fixed to shaft and configured for rotation.

5. The seal section of claim 1, wherein the cap includes a lower opening that permits the introduction of fluid from the mechanical seal chamber inside the cap.

6. The seal section of claim 5, further comprising a lubricant exchange port, wherein the lubricant exchange port extends from the one or more fluid separation mechanisms to inside the cap of the mechanical seal protector.

7. The seal section of claim 5, further comprising a lubricant exchange port, wherein the lubricant exchange port does not extend from the one or more fluid separation mechanisms to the mechanical seal protector.

8. The seal section of claim 5, wherein the cap further comprises a plurality of external vanes configured to increase turbulence within the mechanical seal chamber.

9. The seal section of claim 5, wherein the cap further comprises a plurality of internal vanes configured to increase turbulence within the cap.

10. The seal section of claim 5, wherein the expulsion ports are tapered.

11. The seal section of claim 5, wherein the expulsion ports extend through the cap at an offset angle.

12. The seal section of claim 5, wherein the mechanical seal chamber further comprises:
    a particulates trench disposed about the periphery of the mechanical seal chamber; and
    one or more disposal ports extending from the particulates trench to the wellbore.

* * * * *